(12) United States Patent
Furuichi et al.

(10) Patent No.: US 9,053,333 B2
(45) Date of Patent: Jun. 9, 2015

(54) MANAGING CONFIDENTIAL INFORMATION

(75) Inventors: Sanehiro Furuichi, Tokyo (JP);
Kiriyama Hayato, Kanagawa-ken (JP);
Hiroshi Tanaka, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/127,184

(22) PCT Filed: Apr. 4, 2012

(86) PCT No.: PCT/JP2012/059180
§ 371 (c)(1),
(2), (4) Date: Dec. 18, 2013

(87) PCT Pub. No.: WO2012/176530
PCT Pub. Date: Dec. 27, 2012

(65) Prior Publication Data
US 2014/0130183 A1    May 8, 2014

(30) Foreign Application Priority Data
Jun. 23, 2011  (JP) ................. 2011-139676

(51) Int. Cl.
*G06F 21/62*    (2013.01)
*G06F 17/24*    (2006.01)
*G06F 21/60*    (2013.01)

(52) U.S. Cl.
CPC ............... *G06F 21/62* (2013.01); *G06F 17/24* (2013.01); *G06F 21/606* (2013.01); *G06F 2221/2149* (2013.01); *G06F 2221/2151* (2013.01)

(58) Field of Classification Search
CPC ....... G06F 17/24; G06F 21/606; G06F 21/62; G06F 2221/2151; G06F 2221/2149
USPC .......................................................... 726/27
See application file for complete search history.

(56) References Cited

U.S. PATENT DOCUMENTS 2,768,834 A    10/1956 Wilson
5,592,066 A    1/1997 Fan
(Continued)

FOREIGN PATENT DOCUMENTS

CN    101645034 A    2/2010
CN    102916954 A    2/2013
(Continued)

OTHER PUBLICATIONS

International Search Report, dated May 22, 2012, regarding Application No. PCT/JP2012/059180, 2 pages.
(Continued)

*Primary Examiner* — Kambiz Zand
*Assistant Examiner* — Aubrey Wyszynski
(74) *Attorney, Agent, or Firm* — Yee & Associates, P.C.; Jeffrey S. LaBaw

(57) ABSTRACT

An information processing apparatus, method, and program product for appropriately setting confidentiality of a target electronic document even when copied data is pasted into a document from an electronic document including confidential information, without limiting replication from an electronic document including confidential information depending on attributes of the target electronic document. Also provided is an information processing apparatus, method and program product that saves content data specified by the user and a label indicating the confidentiality of the electronic document including the content data in a clipboard; pastes the user-specified content data to a target electronic document; temporarily saves the label for the electronic document including the user-specified content data in a data table which stores electronic document labels, as a label for the target electronic document; checks the confidentiality of the target electronic document; and establishes or deletes the temporarily saved label.

13 Claims, 8 Drawing Sheets

(56) References Cited

U.S. PATENT DOCUMENTS

| | | | |
|---|---|---|---|
| 8,332,747 B2* | 12/2012 | Carro et al. | 715/243 |
| 2010/0037025 A1* | 2/2010 | Zheltov et al. | 711/128 |

FOREIGN PATENT DOCUMENTS

| | | |
|---|---|---|
| JP | H08255132 A | 10/1996 |
| JP | 2002236679 A | 8/2002 |
| JP | 2004126909 A | 4/2004 |
| JP | 2007280255 A | 10/2007 |
| JP | 2008123243 A | 5/2008 |
| JP | 2008250412 A | 10/2008 |
| JP | 2010055371 A | 3/2010 |
| JP | 2010176431 A | 8/2010 |
| WO | WO9514266 A1 | 5/1995 |
| WO | WO2006103752 A1 | 10/2006 |
| WO | WO2012176530 A1 | 12/2012 |

OTHER PUBLICATIONS

Katsuno et al., "Chinese-Wall Process Confinement for Practical Distributed Coalitions," Proceedings of the 12th ACM Symposium on Access Control Models and Technologies (SACMAT '07), Jun. 2007, pp. 225-234.

* cited by examiner

Fig. 5

| 510 | | | |
|---|---|---|---|
| ELECTRONIC DOCUMENT IDENTIFICATION INFORMATION (511) | LABEL (512) | TIME OF LABEL GENERATION (513) | TIME OF ELECTRIC DOCUMENT UPDATE (514) |
| doc_2011/06/3 | Definitely Confidential | 2011/06/03 14:35 | 2011/6/12 14:12 |
|  | Possibly PII | 2011/06/12 15:40 |  |
| ... | ... | ... | ... |

| 520 | | | |
|---|---|---|---|
| ELECTRONIC DOCUMENT IDENTIFICATION INFORMATION (521) | LABEL (522) | TIME OF LABEL GENERATION (523) | TIME OF ELECTRIC DOCUMENT UPDATE (524) |
| doc_2011/06/12 | Definitely Top-secret | 2011/06/12 10:42 | 2011/6/14 14:12 |
|  | Possibly PII, Confidential | 2011/06/14 13:29 |  |
| ... | ... | ... | ... |

Fig. 8

| APPLICATION IDENTIFICATION INFORMATION | ELECTRONIC DOCUMENT IDENTIFICATION INFORMATION | LABEL | TIME OF LABEL GENERATION | TIME OF ELECTRIC DOCUMENT UPDATE |
|---|---|---|---|---|
| Apr.1 | doc_2011/06/3 | Definitely Confidential | 2011/06/03 14:35 | |
| | | Possibly PII | 2011/06/12 15:40 | 2011/6/12 14:12 |
| Apr.2 | doc_2011/06/12 | Definitely Top-secret | 2011/06/12 10:42 | |
| | | Possibly PII, Confidential | 2011/06/14 13:29 | 2011/6/14 14:12 |
| ... | ... | ... | ... | ... |

811 812 813 814 815 800

MANAGING CONFIDENTIAL INFORMATION

This Application is a continuation of and claims priority under 35 U.S.C. §371 to International Application No. PCT/JP2012/059180 filed on Apr. 4, 2012, which claims priority to JP 2011-139676 filed on Jun. 23, 2011. The contents of both aforementioned applications are incorporated herein by reference.

TECHNICAL FIELD

The present invention relates to Data Loss Prevention or DLP, and more particularly, to an information processing apparatus, method, and program for handling confidential information included in copied data when content data from an electronic document is replicated and used among multiple applications.

BACKGROUND ART

Leakage of confidential information such as personal and sensitive information is a major social issue today. Corporations and public organizations save and manage confidential information on data servers or the like that can be accessed by people over networks. Leakage of such confidential information is prevented by setting various kinds of access right to electronic documents including confidential information to limit access to them.

It is a common practice to create a new electronic document by utilizing content data replicated from an existing electronic document. However, preparation of a new electronic document utilizing an existing electronic document containing confidential information can lead to leakage of confidential information through replication of context data included in the existing document. To address this, various techniques for preventing leakage of confidential information have been proposed.

Patent Literature 1 discloses a method for preventing information leakage by storing copied data with encryption in a clipboard and decrypting the copied data at a target document. In this method, in the case of a source document that should be protected, copied data is sent to the target document if the target document is also a protected document, while dummy data is sent to the target document if the target document is a document not requiring protection, thereby preventing information leakage.

Patent Literature 2 discloses a method for controlling document copy by means of a clipboard with separate areas to save copied data for important documents and general documents. According to the method, if the source document is an important document, specified copied data is saved in a clipboard for important documents. If the target document is an important document, the copied data is read from the clipboard for important documents and pasted. If the target document is a general document, read of the copied data from the clipboard for important documents is prohibited to prevent leakage of an important document.

Patent Literature 3 discloses an electronic document management apparatus that controls access to data saved in a clipboard and authentication information when an electronic document that should be protected is used to create another electronic document. This electronic document management apparatus prevents information leakage by allowing access authority for the protected source electronic document to be inherited to the target electronic document.

CITATION LIST

Patent Literature

[Patent Literature 1] JP2010-055371A
[Patent Literature 2] WO 2006/103752
[Patent Literature 3] JP2008-123243A

SUMMARY OF INVENTION

Technical Problems

The methods disclosed by Patent Literatures 1 and 2, however, do not allow data to be replicated and used from the source document that should be protected or is an important document when the target document does not have to be protected or is not important, failing to provide high usability in electronic document creation.

With the electronic document managing apparatus described in Patent Literature 3, access right to the source electronic document is inherited as it is. Thus, access right that should be established when copied data includes confidential information will be set in the target electronic document even if no confidential information is actually included in copied data.

The present invention is intended to solve the problems, and an object thereof is to provide an information processing apparatus, method, and program for appropriately setting confidentiality of a target electronic document even when copied data is pasted into the document from an electronic document including confidential information, without limiting replication from an electronic document including confidential information depending on attributes of the target electronic document.

SUMMARY

According to the present invention, there is provided an information processing apparatus that saves content data specified by the user and a label indicating the confidentiality of the electronic document including the content data in a clipboard; pastes the user-specified content data to a target electronic document; temporarily saves the label for the electronic document including the content data in a data table which stores electronic document labels, as a label for the target electronic document; checks the confidentiality of the target electronic document and establishes or deletes the temporarily saved label. This enables appropriate setting of confidentiality of a target electronic document without limiting replication from an electronic document including confidential information depending on attributes of the target electronic document.

The present invention can provide a method and a program for appropriately setting confidentiality of a target electronic document without limiting replication from an electronic document including confidential information depending on attributes of the target electronic document, by temporarily saving a label for the electronic document including content data specified by the user in a data table which stores electronic document labels, as a label for the target electronic document, and checking the confidentiality of the target electronic document and establishing or deleting the temporarily saved label.

BRIEF DESCRIPTION OF DRAWINGS

FIG. 5 shows an embodiment of a label table for use by the information processing apparatus according to the embodiment shown in FIG. 1;

FIG. 8 shows an embodiment of a label table for use by the information processing apparatus according to the embodiment shown in FIG. 6.

DESCRIPTION OF EMBODIMENTS

The present invention will be described below with reference to its embodiments though the present invention is not limited to the embodiments described below.

Figure 1:
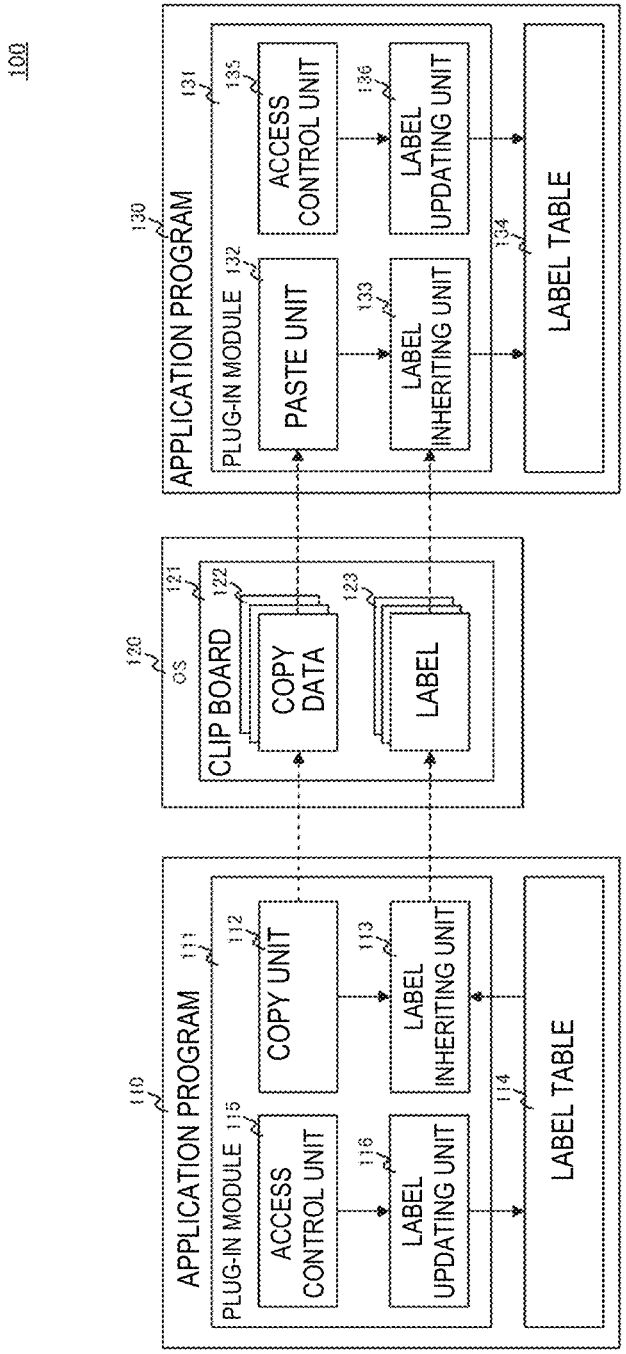
FIG. 1 is a functional block diagram of an information processing apparatus according to an embodiment of the present invention.

FIG. 1 is a functional block diagram of an information processing apparatus according to an embodiment of the present invention. An information processing apparatus 100 is an information processing apparatus that implements applications capable of creating and editing of electronic documents, and may be any of various types of computer including desktop, notebook, and tablet PCs, or a portable information terminal such as a smart phone, mobile phone, or a PDA.

The information processing apparatus 100 executes the program of the present invention written in a program language, such as an assembler, C, C++, Java (a registered trademark), JavaScript (a registered trademark), PERL, PHP, RUBY, PYTHON, under control of an OS, such as any of Windows series OSs including Windows 7 (a registered trademark), Windows Vista (a registered trademark), Windows XP (a registered trademark), Windows 200X Server (a registered trademark), and Windows Mobile (a registered trademark), Mac OS (a registered trademark), UNIX (a registered trademark), LINUX (a registered trademark), Android (a registered trademark), Google Chrome OS, TRON, and ITRON.

The information processing apparatus 100 includes RAM to provide an execution space in which the program of the present invention is executed, and storage devices such as a hard disk device (HDD) and flash memory for long-term storage of programs and data, and executes the program of the present invention to provide the functionality of the present embodiment described later on the information processing apparatus 100. The functional components of the present embodiment can be realized through machine-executable programs written in any of the programming languages listed above. The program of the present invention may be transmitted over a network in a form readable by other information processing apparatuses.

The information processing apparatus 100 includes application programs 110 and 130, and an OS 120.

The OS 120 is a system program responsible for controlling the entire information processing apparatus 100 and provides the function to copy content data of an electronic document between the application programs 110 and 130. The information processing apparatus 100 has a shared memory area (hereinafter, referred to as a clipboard) 121 for temporarily saving content data to be copied and the labels for the data. In response to a copy (or replication) request from the application program 110, which is the copy source, the OS 120 saves context data included in the electronic document being processed by the application in the clipboard 121 as copy target data (hereinafter, "copy data") 122. The OS 120 then copies the copy data 122 in the clipboard 121 to the electronic document being processed by the application program 130, which is the copy target, upon receiving a paste request from the application program 130, or the target program.

The application program 110 is a software program capable of creating and editing content data of electronic documents, such as an editor. The application program 110 includes a plug-in module 111, which is the program provided by the present invention, and a label table 114 managed by the plug-in module.

The plug-in module 111 includes a copy unit 112, a label inheriting unit 113, an access control unit 115, and a label updating unit 116.

The copy unit 112 detects a copy request issued by the user working with the application program 110 through an input interface, such as a keyboard, mouse, touchscreen, and saves context data selected by the user for copy in the clipboard 121 as copy data 122.

The label inheriting unit 113 references the label table 114, in which labels are stored that indicate the confidentiality of an electronic document being processed by the source application program 110, that is, whether confidential information is included in the context data of the electronic document, and saves all labels assigned to the electronic document in the clipboard 121 as meta-information on the copy data 122. The label table 114 will be described in more detail with reference to FIG. 5.

The access control unit 115 controls access to an electronic document that may contain confidential information. Upon detecting an access to an electronic document file, such as an access for opening or printing the file, the access control unit 115 uses the label(s) of the accessed electronic document stored in the label table 114 to limit or permit access to the electronic document (e.g., read, write, or output of the document).

For example, when confidential information is included in the electronic document accessed, the access control unit 115 can limit output of content data of the electronic document. When read of an electronic document is requested, the access control unit 115 references the label table 114 and determines whether confidential information is included in the electronic document. If confidential information is included in the electronic document, the access control unit 115 further makes reference to an authentication table (not shown) in which user identification information and access rights of users (e.g., rights to read, write, output, etc.) and identification information for electronic documents are stored, and determines whether the user requesting an access is authorized to read the electronic document reading of which he/she is requesting. Depending on the result of the determination, the access control unit 115 may permit or reject read of the document.

The label updating unit 116 updates labels, that is, label information stored in the label table 114, and time of label generation. Labels include a temporary label that inherits a label assigned to the source electronic document (hereinafter, referred to as "latent label") and a label that is established by scanning content data of the electronic document into which copy data has been pasted (hereinafter, referred to as "established label"). Latent and established labels of the present embodiment include a label indicating that sensitive or personal information, i.e., confidential information, is present in an electronic document. Other embodiments may employ labels indicating various types of confidential information, e.g., top secret information that can be accessible only to further limited persons, information on unpublished research outcomes or products, and salary information.

The label updating unit 116 references a database (not shown) storing character or numerical strings representing confidential information, and determines whether content data included in an electronic document matches any confidential information in the database to thereby check the confidentiality of the electronic document. According to the result of the check, the label updating unit 116 updates label information in the label tables 114. That is, if it is determined that confidential information is present, the label updating unit 116 changes a latent label for an established label or maintains the established label already established. If it determines that no confidential information is present, the label updating unit 116 deletes the established and latent labels associated with the electronic document.

In the present embodiment, the label updating unit 116 updates label information when there is a request to access an electronic document or on a periodical basis. In other embodiment, label information may be updated when the application program 110 or 130 saves an electronic document.

The application program 130 is a software program capable of creating and editing electronic documents as with the application program 110, and includes a plug-in module 131 and a label table 134 managed by the plug-in module.

The plug-in module 131 includes a paste unit 132, a label inheriting unit 133, an access control unit 135, and a label updating unit 136. The access control unit 135 and label updating unit 136 have similar functions to those of the access control unit 115 and label updating unit 116, so their further descriptions are omitted.

The paste unit 132 detects a paste request issued by the user working with the application program 130 through an input interface, and pastes copy data 122 saved in the clipboard 121 to the electronic document being processed by the application program 130. In the present embodiment, the paste unit 132 is able to paste copy data 122 selected and specified by the user from multiple pieces of copy data 122 saved in the clipboard 121.

In another embodiment, a filtering unit for masking copy data may be provided in the plug-in module 131. The filtering unit may check the confidentiality of an electronic document before paste of copy data as with the label updating unit 116 described above and mask confidential information included in the copy data depending on the result of the check. The paste unit 132 then can paste the copy data with the confidential information masked.

The label inheriting unit 133 takes from the clipboard 121 a label 123 which is meta-information on copy data that has been pasted into the electronic document being processed by the target application program 130, and stores the label in the label table 134 in association with the electronic document. The label inheriting unit 133 inherits labels from the source electronic document by temporarily storing the labels 123 associated with the source document as the labels of the target electronic document. The label table 134 will be described in detail with reference to FIG. 5.

Although in the embodiment shown in FIG. 1 the copy unit 112 and label inheriting unit 113, and the paste unit 132 and label inheriting unit 133 are implemented in the separate plug-in modules 111 and 131 respectively for the sake of description, the information processing apparatus 100 of the present invention may implement these functional components in both the plug-in modules 111 and 131 so that bi-directional copy and paste are available between the application programs 110 and 130.

Figure 2:
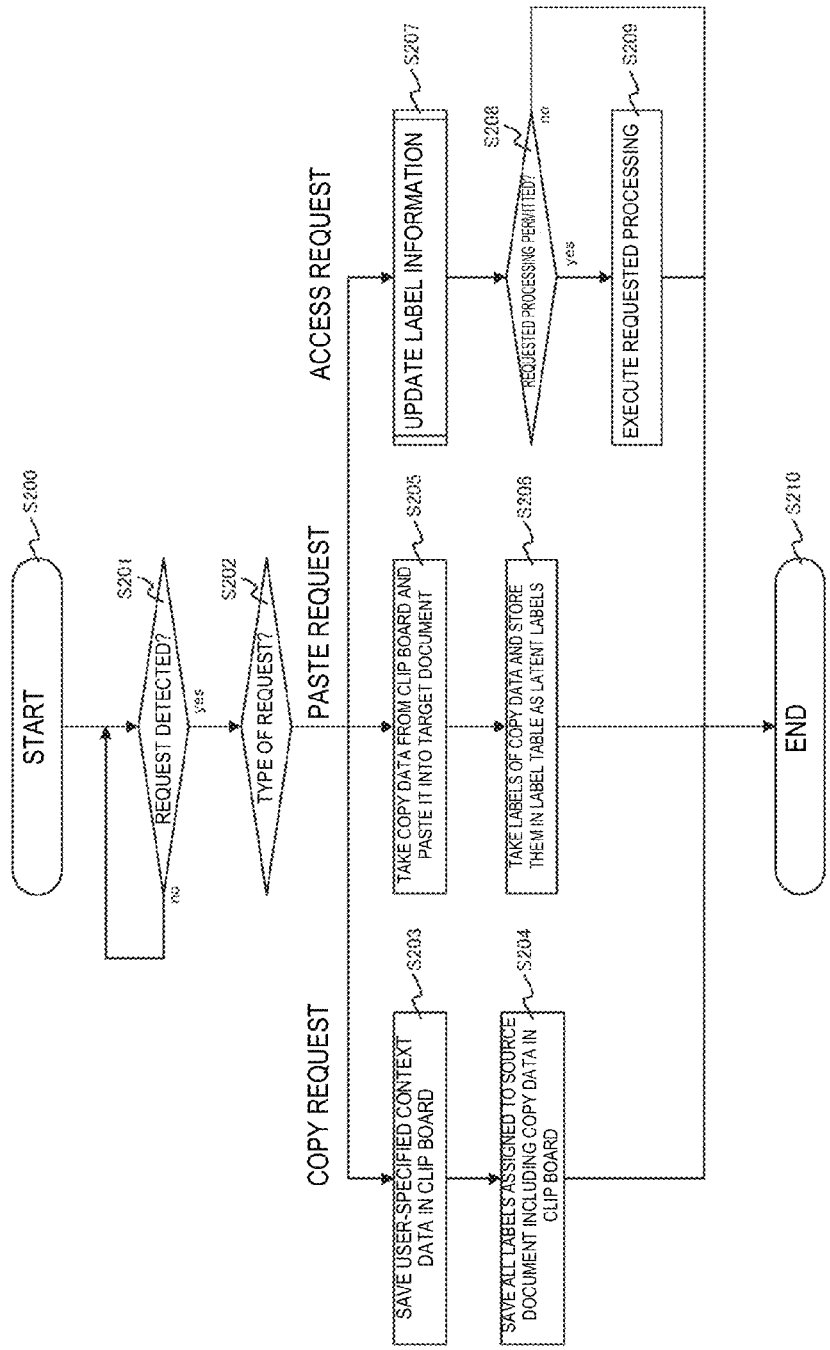
FIG. 2 is a flowchart illustrating an embodiment of processing executed by the information processing apparatus according to the embodiment shown in FIG. 1.

FIG. 2 is a flowchart illustrating an embodiment of processing executed by the information processing apparatus according to the embodiment shown in FIG. 1. Referring to FIG. 2, processing performed by the information processing apparatus 100 will be described.

The process of FIG. 2 starts at step S200. At step S201, the plug-in modules 111 and 131 determine whether they have detected a certain request for the application programs 110 and 130 issued in response to the user's instruction. If no request is detected (No), step S201 is repeated to wait for a request. If a request is detected (Yes), the processing branches to step S202.

At step S202, the plug-in modules 111 and 131 identify the type of the detected request, and processing branches to step S203, S205, or S207 depending on the type. Specifically, if the detected request is for copy, paste, and access, the plug-in modules 111 and 131 branch processing to step S203, S205, and S207, respectively.

At step S203, the copy unit 112 saves user-specified context data included in the source electronic document in the clipboard 121. At step S204, the label inheriting unit 113 saves all labels that are assigned to the source electronic document including the context data in the clipboard 121, and the process ends at step S210.

At step S205, the paste unit 132 takes copy data from the clipboard 121 and pastes it to the electronic document being processed by the target application program. At step S206, the label inheriting unit 133 takes the labels for the copy data from the clipboard 121, and stores them in the label table 134 as latent labels. At step S210, the process ends.

At step S207, the access control unit 115, 135 calls the label updating unit 116, 136, which then updates the label table 114, 134. At step S208, the access control unit 115, 135 determines whether requested processing may be permitted. If it is determined that the requested processing should not be permitted (No), the processing branches to step S210, where it ends. If it is determined that the requested processing is permitted (Yes), the processing branches to step S209. At step S209, the application program 110, 130 executes the requested processing, and the process ends at step S210.

The present embodiment can improve operability at the time of paste because copy data is not scanned before paste thereof and presence or absence of confidential information is determined through a separate process, which will be described with FIG. 3.

Figure 3:
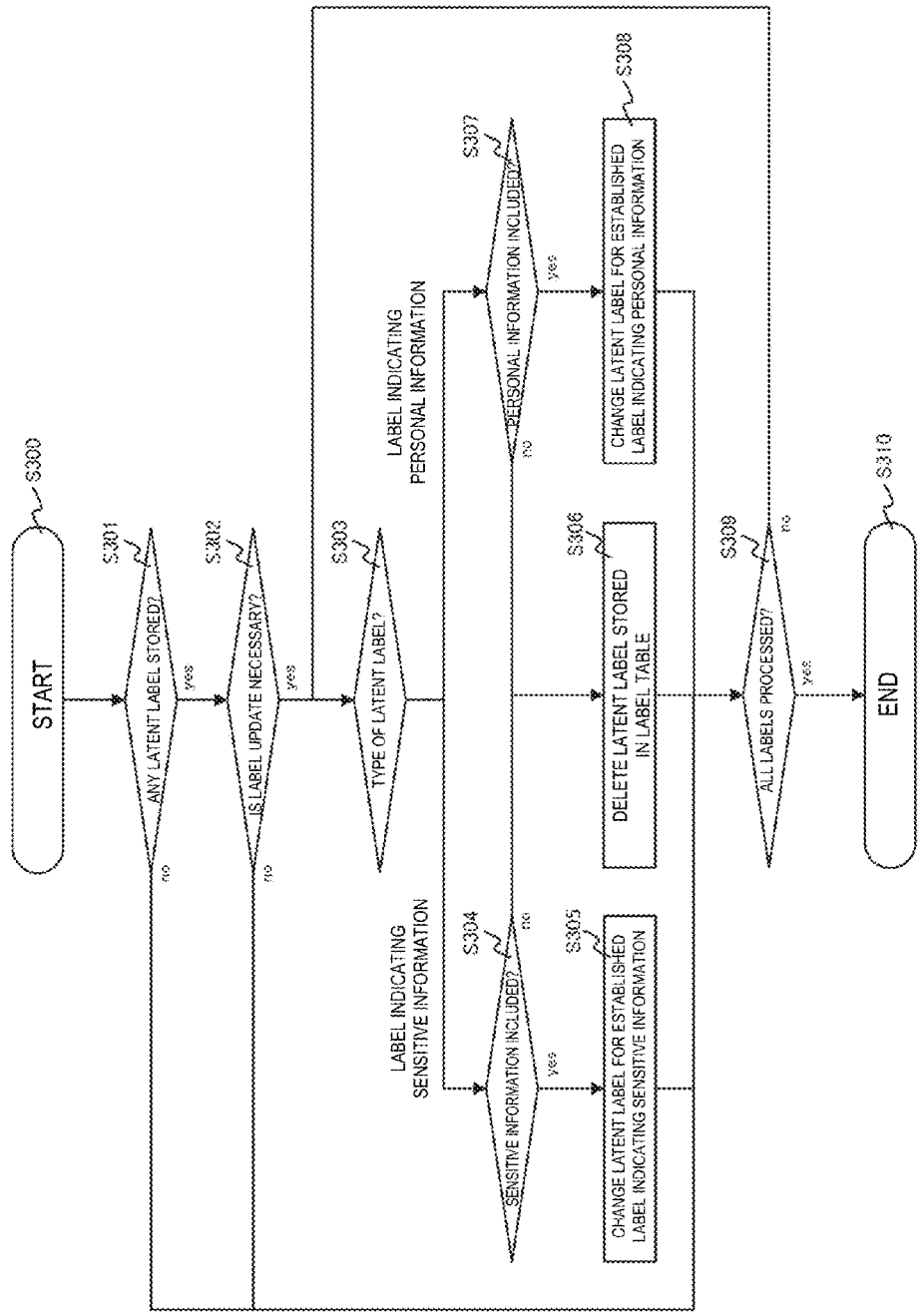
FIG. 3 is a flowchart illustrating a process to establish a latent label performed by the information processing apparatus of the embodiment.

FIG. 3 is a flowchart illustrating a process to establish a latent label performed by the information processing apparatus of the present embodiment. Although the present embodiment periodically performs establishment of latent labels, in other embodiments establishment of a latent label may be done when the application programs 110 and 130 save an electronic document. Latent label establishment will be described below with reference to FIG. 3.

The process of FIG. 3 starts at step S300. At step S301, the label updating unit 116, 136 of the plug-in module 111, 131 references the label table 114, 134, and determines whether any latent label associated with the electronic document being processed by the application program 110, 130 is stored. If no latent label is stored (No), processing branches to step S309. If a latent label is stored (Yes), processing branches to step S302.

At step S302, the label updating unit 116, 136 determines whether update of label information stored in the label table 114, 134 is required or not. In the present embodiment, the label updating unit 116, 136 references the label table 114, 134, and compares the time the latent label was generated, i.e., the time at which copy data was pasted, with the time the electronic document was last updated. If the update time of the electronic document is later, update of label information is determined to be necessary.

If it is determined that update of label information is not necessary at step S302 (No), processing branches to step S309. If it is determined that update of label information is necessary (Yes), processing branches to step S303.

At step S303, the label updating unit 116, 136 identifies the type of the latent label. If it is a label indicating sensitive information, processing branches to step S304. If it is a label indicating personal information, processing branches to step S307.

At step S304, the label updating unit 116, 136 scans the electronic document with which the latent label is associated to check if the document actually includes sensitive information. If the check shows that sensitive information is included (Yes), processing branches to step S305. At step S305, the label updating unit 116, 136 changes the latent label for an established label that indicates sensitive information is included in the document.

If it is determined at step S304 that no sensitive information is included (No), processing branches to step S306. At step S306, the label updating unit 116, 136 deletes the latent label from the label table 114, 134.

At step S307, the label updating unit 116, 136 scans the electronic document with which the latent label is associated to check if the document actually includes personal information. If the check shows that personal information is included (Yes), processing branches to step S308. At step S308, the label updating unit 116, 136 changes the latent label for an established label indicating that personal information is included in the document.

If it is determined at step S307 that no personal information is included (No), processing branches to step S306. At step S306, the label updating unit 116, 136 deletes the latent label from the label table 114, 134.

At step S309, the label updating unit 116, 136 determines whether the above-described process has been done on all the labels assigned to the electronic document being processed by the application program 110, 130. If the process has not been executed on all labels (No), processing returns to step S303, where the process is executed on all the labels. If the process has been done on all the labels (Yes), processing ends at step S310.

Figure 4:
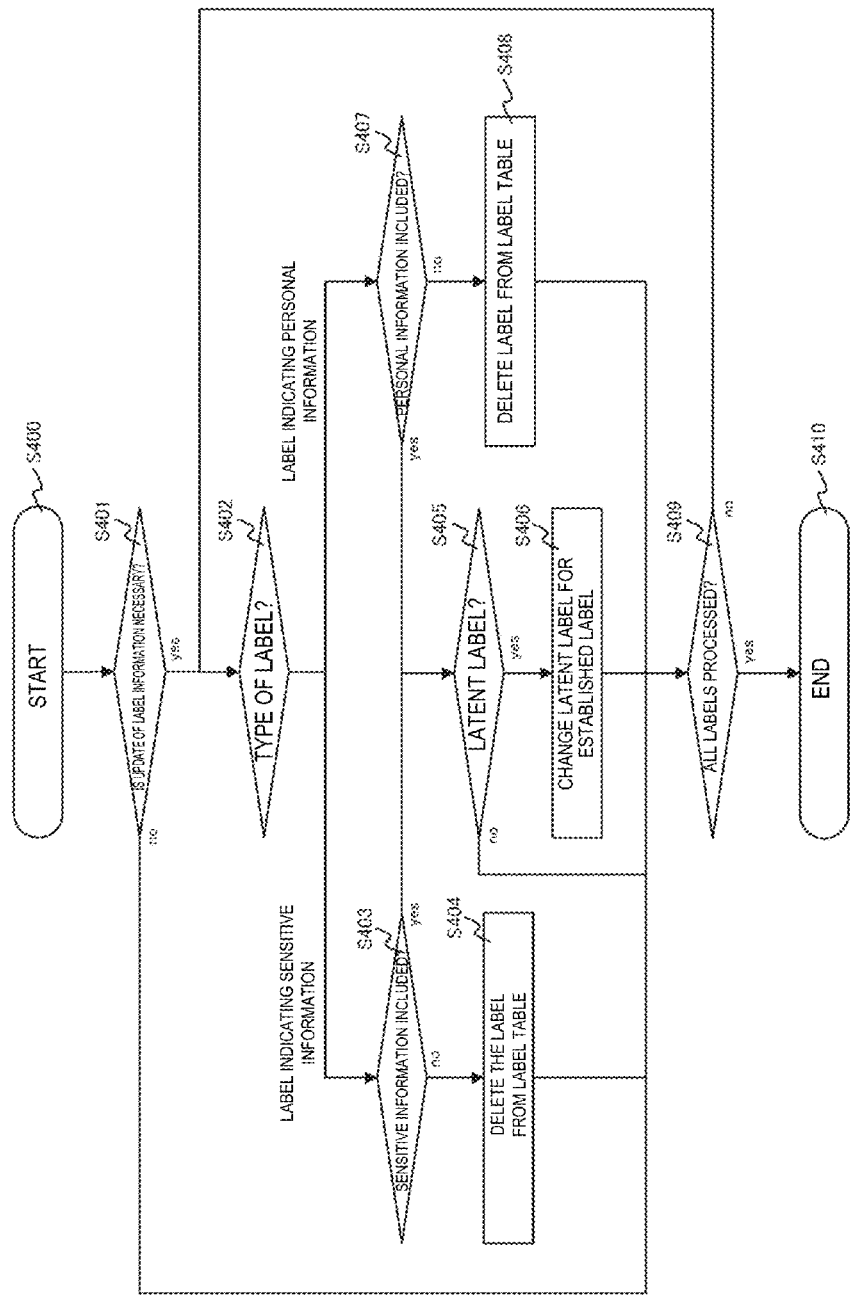
FIG. 4 is a flowchart illustrating a process to update label information performed by the information processing apparatus according to the embodiment when receiving an access request.

FIG. 4 is a flowchart illustrating a process to update label information performed by the information processing apparatus according to the present embodiment upon receiving an access request. Referring to FIG. 4, update of label information performed in step S207 shown in FIG. 2 will be described.

The process of FIG. 4 starts at step S400. At step S401, the label updating unit 116, 136 of the plug-in module 111, 131 determines whether update of label information stored in the label table 114, 134 is required.

In the present embodiment, the label updating unit 116, 136 references the label table 114, 134 and compares the time a label of the electronic document an access to which is requested was generated with the time the electronic document was last updated. If the update time of the electric document is later, it is determined that update of label information is necessary. In other embodiment, update of label information may be determined to be necessary if the labels of the electronic document an access to which is requested are stored in the label table 114, 134.

If it is determined that update of label information is not necessary at step S401 (No), processing branches to step S409. If it is determined that update of label information is necessary (Yes), processing branches to step S402.

At step S402, the label updating unit 116, 136 references the label table 114, 134 and identifies the type of a label associated with the electronic document an access to which is requested. If the label is an established label or latent label indicating sensitive information, processing branches to step S403. If the label is an established label or latent label indicating personal information, processing branches to step S407.

At step S403, the label updating unit 116, 136 scans the electronic document with which the label indicating sensitive information is associated to check if the document actually includes sensitive information. If the check shows that no sensitive information is included (No), processing branches to step S404. At step S404, the label updating unit 116, 136 deletes the label from the label table 114, 134.

If it is determined at step S403 that sensitive information is included (Yes), processing branches to S405. At step S405, the label updating unit 116, 136 determines whether the label indicating the sensitive information is a latent label, and branches processing to step S409 if it is not a latent label. If the label is a latent label (Yes), processing branches to step S406. At step S406, the label updating unit 116, 136 changes the latent label for an established label indicating that sensitive information is included.

At step 407, the label updating unit 116, 136 scans the electronic document with which the label indicating personal information is associated to check if the document actually includes personal information. If it is determined that no personal information is included (No), processing branches to step S408. At step S408, the label updating unit 116, 136 deletes the label from the label table 114, 134.

If it is determined at step S407 that personal information is included (Yes), processing branches to step S405. At step S405, the label updating unit 116, 136 determines whether the label indicating the personal information is a latent label, and branches processing to step S409 if it is not a latent label (No). If the label is a latent label (Yes), processing branches to step S406. At step S406, the label updating unit 116, 136 changes the latent label for an established label indicating that personal information is included.

At step 409, the label updating unit 116, 136 determines whether the above-described process has been done on all the labels assigned to the electronic document an access to which is requested. If the process has not been executed on all labels (No), processing returns to step S402 where the process is executed on all the labels. If the process has been done on all the labels (Yes), processing ends at step S410.

The present embodiment enables low-load and fast determination since determination on sensitive information and personal information is performed through a separate process. Although the above embodiment performs determination on sensitive information in one process, in other embodiments, sensitive information may be further classified by the degree of importance (e.g., sensitive information of high, medium, or low confidentiality) and a label representing such a level of importance may be associated with an electronic document.

FIG. 5 shows an embodiment of a label table for use by the information processing apparatus according to the embodiment shown in FIG. 1. Label tables 510 and 520 will be described below with reference to FIG. 5.

The label table 510 is a data table used by the plug-in module 111 implemented in the source application program. In the label table 510, electronic document identification information 511, label 512, time of label generation 513, and time of electrical document update 514 are stored as being associated with each other.

The electronic document identification information 511 is information that uniquely identifies an electronic document processed by the source application program. The label 512 indicates the confidentiality of the electronic document identified by the electronic document identification information. The time of label generation 513 is the time at which the label was stored or updated. The time of electrical document update 514 is the time at which the electronic document represented by the electronic document identification information was saved and updated by the user.

In the label table 510, "Definitely Confidential", which is an established label for sensitive information that is already established by scanning of the electronic document, and "Possibly PII (Personally Identifiable Information)", which is a latent label for personal information not established yet, are stored as the labels of the electronic document represented by electronic document identification information "doc_2011/06/3". That is, the labels indicate that the electronic document includes sensitive information and that copy data which may include personal information has been pasted into the document from another electronic document.

The label table 520 is a data table for use by the plug-in module 131 implemented in the target application program. In the label table 520, electronic document identification information 521, label 522, time of label generation 523, and time of electrical document update 524 are stored as being associated with each other as in the label table 510.

In the label table 520, labels inherited from the label table 510 are stored. That is, the label table 520 has stored therein "Possibly Confidential", a latent label for sensitive information, and "Possibly PII", a latent label for personal information that were originally the established label "Definitely Confidential" for sensitive information and the latent label "Possibly PII" for personal information stored in the label table 510, respectively.

Although one piece of electronic document identification information is stored in each of the label tables 510 and 520 in the present embodiment, in other embodiments label information for multiple electronic documents may be stored and the plug-in modules 111 and 131 may manage multiple electronic documents.

Figure 6:
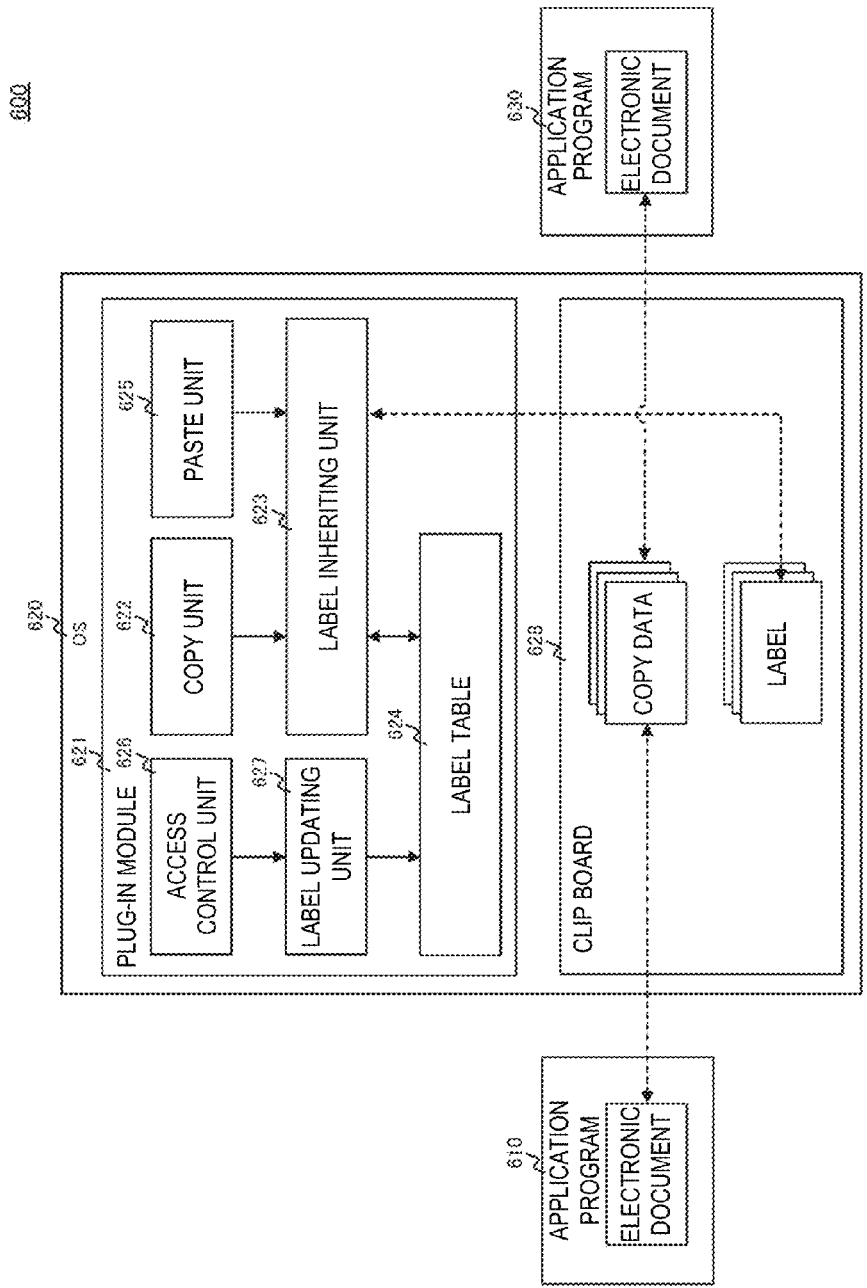
FIG. 6 is a functional block diagram of an information processing apparatus according to another embodiment of the present invention.

FIG. 6 is a functional block diagram of an information processing apparatus according to another embodiment of the present invention. As an information processing apparatus 600 of the present embodiment is similar to the above information processing apparatus 100, the following descriptions will mainly focus on differences between the two.

The information processing apparatus 600 includes application programs 610, 630, and an OS 620 as the information processing apparatus 100. In the present embodiment, the plug-in module 621 is implemented in the OS 620, instead of the application programs 610 and 630.

The plug-in module 621 includes a copy unit 622, a label inheriting unit 623, a label table 624, a paste unit 625, an access control unit 626, and a label updating unit 627. The copy unit 622, access control unit 626, and label updating unit 627 have similar functions as those of the copy unit 112, access control units 115 and 135, and label updating units 116 and 136, respectively.

The paste unit 625 determines whether copy data may be pasted into the target application program, in addition to the functions of the paste unit 132. The paste unit 625 references definition information, such as a definition file, that specifies application programs for which use of the copy and paste functions provided by the present invention is permitted and determines whether identification information of an application that issued a paste request is included in the definition information, thereby determining whether the copy data may be pasted to the application program.

The label inheriting unit 623 inherits the labels of the source application program into the target application. In the present embodiment, when user-specified context data included in the source electronic document is saved in the clipboard 628 or when copy data saved in the clipboard 628 is pasted into the target electronic document, the application program 610, 630 sends the identification information of the application program and identification information of the electronic document being processed by the application program to the plug-in module 621.

When the plug-in module 621 receives a copy request from the application program 610, the label inheriting unit 623 references the label table 624, takes the labels of the electronic document using the identification information of the application program and the identification information of the electronic document being processed by the application program received from the application program 610, and saves the labels in the clipboard 628.

When the plug-in module 621 receives a paste request from the application program 630, the label inheriting unit 623 takes the labels for copy data to be pasted from the clipboard 628, and temporarily stores the labels in the label table 624 as the labels of the electronic document using the identification information of the application program and the identification information of the electronic document being processed by the application program, which are received from the target application program 630.

Figure 7:
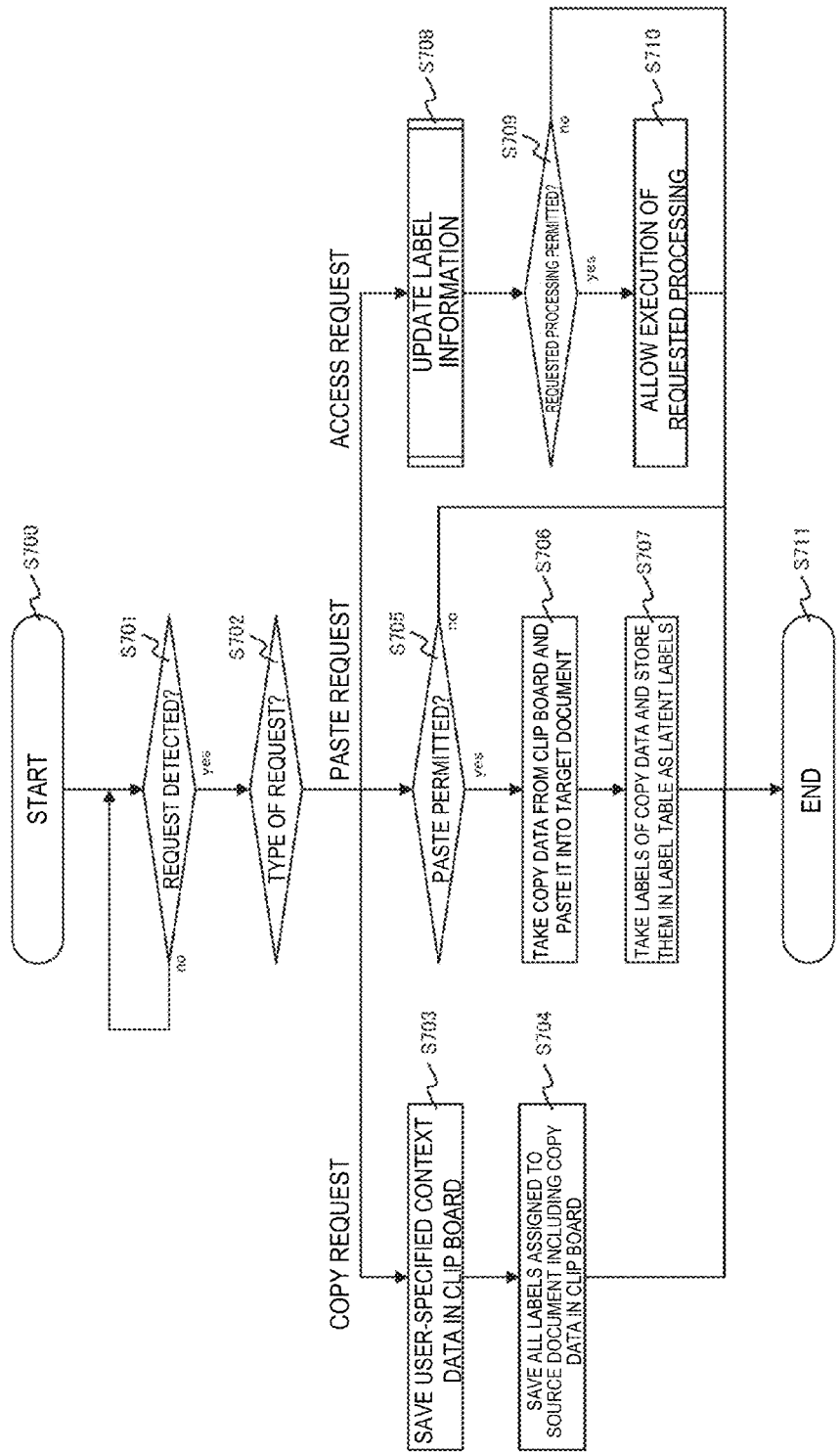
FIG. 7 is a flowchart illustrating an embodiment of processing executed by the information processing apparatus according to the embodiment shown in FIG. 6.

FIG. 7 is a flowchart illustrating an embodiment of processing performed by the information processing apparatus according to the embodiment shown in FIG. 6. Referring to FIG. 7, processing performed by the information processing apparatus 600 will be described.

The process of FIG. 7 starts at step S700. At step S701, the plug-in module 621 determines whether a certain request issued in response to the user's instruction for the application program 610 or 630 has been detected. If no request is detected (No), step S701 is repeated to wait for a request. If a request is detected (Yes), processing branches to step S702.

At step S702, the plug-in module 621 identifies the type of the detected request, and branches processing to step S703, S705, or S708 depending on the type. Specifically, if the detected request is for copy, paste, and access, the plug-in module 621 branches processing to step S703, S705, and S708, respectively.

At step S703, the copy unit 622 saves user-specified context data included in the source electronic document in the clipboard 628. At step S704, the label inheriting unit 623 saves all the labels assigned to the source electronic document including the context data in the clipboard 628. At step S711, the process ends.

At step S705, the paste unit 625 determines whether paste is permitted for the application program requesting paste. If paste is not permitted for the application (No), processing branches to step S711, where the process ends. If paste is permitted (Yes), processing branches to step S706.

At step S706, the paste unit 625 takes copy data from the clipboard 628 and pastes the data into the electronic document being processed by the target application program. At step 707, the label inheriting unit 623 takes the labels of the copy data from the clipboard 628 and stores the labels in the label table 624 as latent labels. At step S711, the process ends.

At step 708, the access control unit 626 calls the label updating unit 627, which then updates the label table 624. At step 709, the access control unit 626 determines whether the requested processing may be permitted. If it determines that the processing is not permitted (No), processing branches to step S711, where the process ends. If the access control unit 626 determines that the processing is permitted (Yes), processing branches to step S710. At step 710, the access control unit 626 allows the application requesting an access to perform the processing it requested. At step S711, the process ends.

FIG. 8 shows an embodiment of a label table for use by the information processing apparatus according to the embodiment shown in FIG. 6. The following description will mainly focus on the differences of a label table 800 from the label tables 510 and 520 with reference to FIG. 8.

In the label table 800, application identification information 811, which is information uniquely identifying an application for which the copy and paste functions provided by the present invention can be utilized, electronic document identification information 812, label type 813, time of label generation 814, and time of electrical document update 815 are stored as being associated with each other.

In the present embodiment, the label inheriting unit 623 references the label table 800 and identifies a corresponding electronic document using application identification information 811 and electronic document identification information 812 received from the source or target application program. The label inheriting unit 623 then takes the labels of the source electronic document and temporarily stores them as the labels of the target electronic document.

The label updating unit 627 can determine the confidentiality of the electronic document associated with application identification information 811 received from a running application program, and establish a latent label temporarily assigned to the electronic document. The label updating unit 627 can also use application identification information and electronic document identification information 812 received from an application program requesting an access to identify the electronic document an access to which is being requested, determine the confidentiality of the electronic document, and update the label information for the electronic document.

While the invention has been described with reference to its embodiments, the present invention is not limited to the above embodiments and may be modified within a scope that can be conceived by those skilled in the art, such as change or deletion of the functional elements of the embodiments, and addition of other functional elements. Such embodiments fall within the scope of the present invention in any aspect as long as they provide the operation and effects of the invention.

REFERENCE SIGNS LIST

100 . . . information processing apparatus, 110, 130 . . . application program, 111, 131 . . . plug-in module, 112 . . . copy unit, 132 . . . paste unit, 113, 133 . . . label inheriting unit, 114, 134 . . . label table, 115, 135 . . . access control unit, 116, 136 . . . label updating unit, 120 . . . OS, 121 . . . clipboard, 122 . . . copy data, 123 . . . label, 600 . . . information processing apparatus, 610, 630 . . . application program, 620 . . . OS, 621 . . . plug-in module, 622 . . . copy unit, 623 . . . label inheriting unit, 624 . . . label table, 625 . . . paste unit, 626 . . . access control unit, 627 . . . label updating unit, 628 . . . clipboard

The invention claimed is:

1. An information processing apparatus configured to replicate content data included in an electronic document, the information processing apparatus comprising:
   a copy unit that saves, to a clipboard, content data specified by a user and included in a source electronic document from which data is copied;
   a first label inheriting unit that saves a label indicating confidentiality of the source electronic document in the clipboard;
   a paste unit that pastes the content data specified by the user to a target electronic document to which the data is copied;
   a second label inheriting unit that temporarily saves a label for the electronic document including the content data specified by the user in a data table which stores a label for the electronic document, as a label for the target electronic document; and
   a label updating unit that checks the confidentiality of the target electronic document and establishes or deletes the temporarily saved label.

2. The information processing apparatus according to claim 1, wherein the information processing apparatus periodically checks the confidentiality of the target electronic document and establishes or deletes the temporarily saved label.

3. The information processing apparatus according to claim 1, wherein if the target electronic document is saved, the information processing apparatus periodically checks the confidentiality of the target electronic document and establishes or deletes the temporarily saved label.

4. The information processing apparatus according to claim 1, wherein when there is a request for accessing the target electronic document, the information processing apparatus updates the label for the target electronic document stored in the data table.

5. The information processing apparatus according to claim 1, wherein information having confidentiality in the electronic document is confidential information.

6. An information processing apparatus configured to replicate content data included in an electronic document, the information processing apparatus comprising:
   a copy unit that saves, to a clipboard, content data specified by a user and included in a source electronic document from which data is copied;
   a paste unit that pastes the content data specified by the user to a target electronic document to which the data is copied;
   a label inheriting unit that saves a label indicating confidentiality of the source electronic document in the clipboard and temporarily saves a label for the electronic document including the content data specified by the user in a data table which stores a label for the electronic document, as a label for the target electronic document; and
   a label updating unit that checks the confidentiality of the target electronic document and establishes or deletes the temporarily saved label.

7. A method for replicating content data included in an electronic document, the method comprising an information processing apparatus executing the steps of:

saving content data specified by a user and included in a source electronic document from which data is copied and a label indicating confidentiality of the electronic document in a clipboard;

pasting the content data specified by the user to a target electronic document to which the data is copied;

temporarily saving a label for the electronic document including the content data specified by the user in a data table which stores a label indicating confidentiality of the electronic document, as a label for the target electronic document; and checking the confidentiality of the target electronic document and establishing or deleting the temporarily saved label.

8. The method according to claim 7, wherein the method comprises the information processing apparatus periodically executing the step of establishing or deleting the temporarily saved label.

9. The method according to claim 7, wherein the information processing apparatus executes the step of establishing or deleting the temporarily saved label when the target electronic document is saved.

10. The method according to claim 7, further comprising the information processing apparatus executing a step of, when there is a request for accessing the target electronic document, updating the label for the target electronic document stored in the data table.

11. The method according to claim 7, wherein information having confidentiality in the electronic document is confidential information.

12. A program stored in a memory device and executable by an apparatus for causing an information processing apparatus capable of replicating content data included in an electronic document to execute a method to be executed by the information processing apparatus, the program causing the information processing apparatus to execute the steps of:

saving content data specified by a user and included in a source electronic document from which data is copied and a label indicating confidentiality of the electronic document in a clipboard;

pasting the content data specified by the user to a target electronic document to which the data is copied;

temporarily saving a label for the electronic document including the content data specified by the user in a data table which stores a label indicating confidentiality of the electronic document, as a label for the target electronic document; and checking the confidentiality of the target electronic document and establishing or deleting the temporarily saved label.

13. An information processing apparatus configured to replicate content data included in an electronic document, wherein content data specified by a user and included in a source electronic document from which data is copied and a label indicating confidentiality of the electronic document are saved in a clipboard; the content data specified by the user is pasted to a target electronic document to which the data is copied; a label for the electronic document including the content data specified by the user is temporarily saved in a data table which stores a label for the electronic document, as a label for the target electronic document; the confidentiality of the target electronic document is periodically checked and the temporarily saved label is established or deleted; when there is a request for accessing the target electronic document, the label for the target electronic document stored in the data table is updated; and information having confidentiality in the electronic document is confidential information.

* * * * *